(12) United States Patent
Masuda et al.

(10) Patent No.: US 12,278,055 B2
(45) Date of Patent: Apr. 15, 2025

(54) ELECTRONIC COMPONENT

(71) Applicant: TDK CORPORATION, Tokyo (JP)

(72) Inventors: Akihiro Masuda, Tokyo (JP); Shinya Ito, Tokyo (JP); Norihisa Ando, Tokyo (JP); Hideki Kaneko, Tokyo (JP); Ken Aburakawa, Tokyo (JP); Kenya Tamaki, Tokyo (JP); Akitoshi Yoshii, Tokyo (JP)

(73) Assignee: TDK CORPORATION, Tokyo (JP)

( * ) Notice: Subject to any disclaimer, the term of this patent is extended or adjusted under 35 U.S.C. 154(b) by 127 days.

(21) Appl. No.: 18/154,165

(22) Filed: Jan. 13, 2023

(65) Prior Publication Data

US 2023/0268128 A1 Aug. 24, 2023

(30) Foreign Application Priority Data

Feb. 24, 2022 (JP) ................ 2022-027091

(51) Int. Cl.
*H01G 4/224* (2006.01)
*H01G 4/005* (2006.01)
*H01G 4/12* (2006.01)
*H01G 4/248* (2006.01)

(52) U.S. Cl.
CPC ............. *H01G 4/224* (2013.01); *H01G 4/005* (2013.01); *H01G 4/12* (2013.01); *H01G 4/248* (2013.01)

(58) Field of Classification Search
None
See application file for complete search history.

(56) References Cited

U.S. PATENT DOCUMENTS

| | | | | |
|---|---|---|---|---|
| 2018/0182553 A1* | 6/2018 | Yazawa | ................. | H01G 4/224 |
| 2020/0098521 A1* | 3/2020 | Ito | ............. | H01G 4/38 |
| 2023/0061638 A1* | 3/2023 | Masuda | ................ | H01G 4/224 |
| 2023/0268127 A1* | 8/2023 | Sato | ....................... | H01G 2/106 |
| | | | | 361/306.1 |
| 2023/0402228 A1* | 12/2023 | Masuda | ................... | H01G 4/12 |
| 2023/0411077 A1* | 12/2023 | Masuda | ................ | H01G 4/224 |

FOREIGN PATENT DOCUMENTS

| | | | |
|---|---|---|---|
| JP | H06-196348 A | | 7/1994 |
| JP | H09232104 A | * | 9/1997 |
| KR | 20100035091 A | * | 4/2010 |

* cited by examiner

Primary Examiner — Nathan Milakovich
(74) *Attorney, Agent, or Firm* — Oliff PLC

(57) ABSTRACT

An electronic component having a case including an accommodation part having an opening; a ceramic element in the accommodation part with first and second main faces facing each other, a first and second electrode formed to the first and second main face, respectively; a first metal terminal including a first electrode connecting part connecting to the first electrode, a first mounting part exposed out of the accommodation part through the opening, and a first terminal arm part connecting the first electrode connecting part and the first mounting part; a second metal terminal including a second electrode connecting part connecting to the second electrode, a second mounting part exposed out of the accommodation part through the opening, and a second terminal arm part connecting the second electrode connecting part and the second mounting part; and an insulation member between the first electrode and the second terminal arm part.

12 Claims, 17 Drawing Sheets

470

ELECTRONIC COMPONENT

TECHNICAL FIELD

The present invention relates to an electronic component used as a capacitor and so on.

BACKGROUND

Conventionally, capacitors having structures that metal electrodes are connected to a single plate type dielectric disk have been proposed. Also, an electronic component which is suited for surface mounting by molding an area around such dielectric disk with an exterior material has been proposed.

However, the conventional surface mounting electronic component requires a step of molding using an exterior material after fixing the dielectric disk and the metal terminals in a cavity for resin molding. Hence, for the conventional surface mounting electronic component, an assembling step was complicated. Also, a metal mold needs to be changed depending on a change in the size of the dielectric disk, thus it was difficult to flexibly adjust to the size changes of the dielectric disk.

[Patent Document 1] JP Patent Application Laid Open No. H06-196348

SUMMARY

The object of the present disclosure is to provide an electronic component capable of flexibly adjusting to a size change and so on of an internal ceramic element, and to provide an electronic component capable of ensuring suitable insulation properties.

The electronic component as one of embodiments solving the above-mentioned object includes
- a case including an accommodation part having an opening;
- a ceramic element arranged in the accommodation part and has a first main face and a second main face facing each other, a first electrode formed to the first main face, and a second electrode formed to the second main face;
- a first metal terminal including a first electrode connecting part connecting to the first electrode, a first mounting part exposed out of the accommodation part through the opening, and a first terminal arm part connecting the first electrode connecting part and the first mounting part;
- a second metal terminal including a second electrode connecting part connecting to the second electrode, a second mounting part exposed out of the accommodation part through the opening, and a second terminal arm part connecting the second electrode connecting part and the second mounting part; and
- an insulation member arranged in the accommodation part between the first electrode and the second terminal arm part.

Such electronic component accommodates the ceramic element in the accommodation part of the case having the opening, hence, there is no need to have a step of molding using an exterior material after arranging the ceramic element and so on in a cavity for a resin molding. Thus, such electronic component can flexibly adjust to the size change and so on of the ceramic element, and achieves a good productivity. On the other hand, since the first and second mounting parts are exposed out of the accommodation part through the opening, the distance between the first electrode and the second terminal arm part becomes close. However, because the insulation member is arranged between the first electrode and the second terminal arm part, such electronic component can ensure suitable insulation property.

Also, for example, the insulation member may intersect a virtual line which connects the first electrode and the second terminal arm part in a minimum distance along an extending face of the first main face.

As the insulation member intersects such virtual line, an insulation distance becomes long, and further enhanced insulation property can be ensured. Note that, in the electronic component, the accommodation part may be filled with the mold resin, hence the insulation member may not cross the virtual line in some cases.

Also, for example, the first main face may be facing to a side of the opening, and the second main face may be facing to an opposite side of the opening.

In such electronic component, the length of the accommodation part in a depth direction can be shortened, thus for example it is advantageous from the point of lowering the height of the electronic component.

Also, for example, the electronic component may include a case cover at least partially covering the opening.

In such electronic component, the accommodation part can be covered using a case cover, thus an opening area of the case can be widened, and assembling can be done easily.

Also, for example, at least part of the insulation member may connect to the case cover.

Regarding such electronic component, since the case cover covers the opening, the insulation member is arranged to a predetermine position, thus the insulation member can be accurately arranged to the position, and also each member can be easily arranged in the accommodation part during assembling.

Also, for example, the second electrode connecting part may be facing a bottom face of the accommodation part, and the second terminal arm part may include a rising part which stands up from the bottom face and extends towards the opening.

As the second terminal arm part includes the rising part, while securing a sufficient depth to the accommodation part, the case can have a simple configuration that the first metal terminal and the second metal terminal are placed out from the same opening. Therefore, such electronic component achieves excellent productivity, and also the electronic component can further flexibly adjust to the design change and so on of the ceramic element.

Also, for example, the first main face and the second main face may face along a direction which is roughly perpendicular to the opening.

Such electronic component can shorten the length in the width direction of the opening, thus, for example, this is advantageous from the point of achieving smaller mounting area.

Also, the insulation member may include a first portion arranged between the first electrode and the second terminal arm part in the accommodation part, and a second portion arranged between the second electrode and the first terminal arm part in the accommodation part.

In such electronic component, even though the first main face and the second main face are arranged along a direction roughly perpendicular to the opening, a suitable insulation property can be achieved between the electrode and the terminal arm part.

Also, for example, at least part of the insulation member may connect to the case.

As the insulation member connects to the case, the insulation member can be accurately positioned in the accommodation part.

Also, for example, the insulation member may be at least partially separate from the case.

As the insulation member and the case are separate, for example, after the ceramic element and the metal terminals are arranged in the accommodation part, the insulation member can be arranged to a predetermined position in the accommodation part. Hence, such electronic component can be assembled easily.

Also, for example, at least part of the insulation member may be arranged to the opening.

In such electronic component, the insulation member can also function as a cover which at least partially covers the opening, thus for example, in case the mold resin and so on are arranged in the accommodation part, such insulation member can prevent the mold resin and so on from leaking out of the accommodation part.

Also, for example, the electronic component may have a mold resin arranged in the accommodation part.

In such electronic component, the mold resin can protect the ceramic element and so on arranged in the accommodation part, and also the insulation property can be enhanced.

BRIEF DESCRIPTION OF THE SEVERAL VIEWS OF THE DRAWING(S)

DETAILED DESCRIPTION

In below, each embodiment is described using the figures.

First Embodiment

Figure 1:
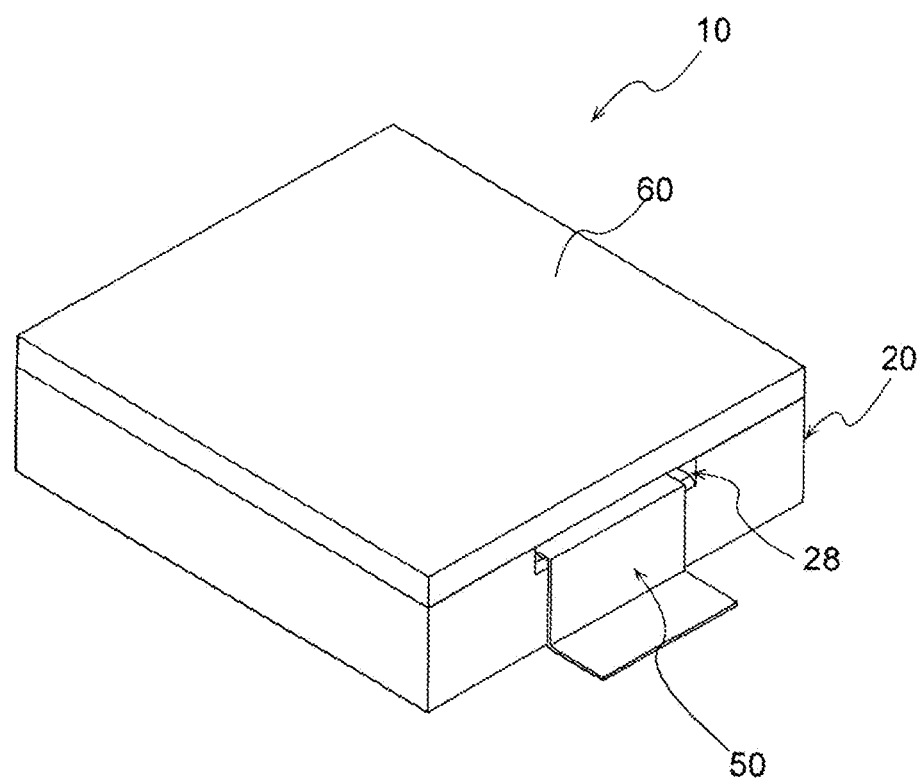
FIG. 1 is a schematic perspective diagram of an electronic component according to the first embodiment viewing from diagonally above.
Figure 1:
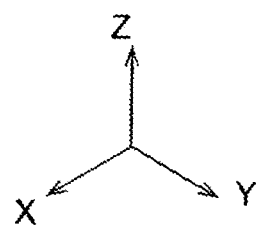

FIG. 1 is a schematic perspective diagram of an electronic component 10 according to the first embodiment viewing from diagonally above. As shown in FIG. 1, the electronic component 10 has a case 20 including an accommodation part 21 (see FIG. 2) in it, and a case cover 60 which covers an opening 21a (see FIG. 2) provided to the accommodation part 21. Also, as shown in FIG. 2 which is the electronic component 10 before installing the case cover 60, the electronic component 10 has a ceramic element 30 arranged in the accommodation part 21 of the case 20, a first metal terminal 40 connecting to a first electrode 33 of the ceramic 30, and a second metal terminal 50 connecting to a second electrode 34 of the ceramic element 30.

As shown in FIG. 1, the electronic component 10 has an approximately rectangular plate shape, but it is not limited to this, and it may be any other shapes such as a polygonal plate shape, a circular disc shape, and the like. As shown in the cross-section image of FIG. 4, an opposite side where the case cover 60 of the electronic component 10 is arranged is a mounting face side facing a substrate and so on, which is where the electronic component 10 is actually mounted.

Figure 2:
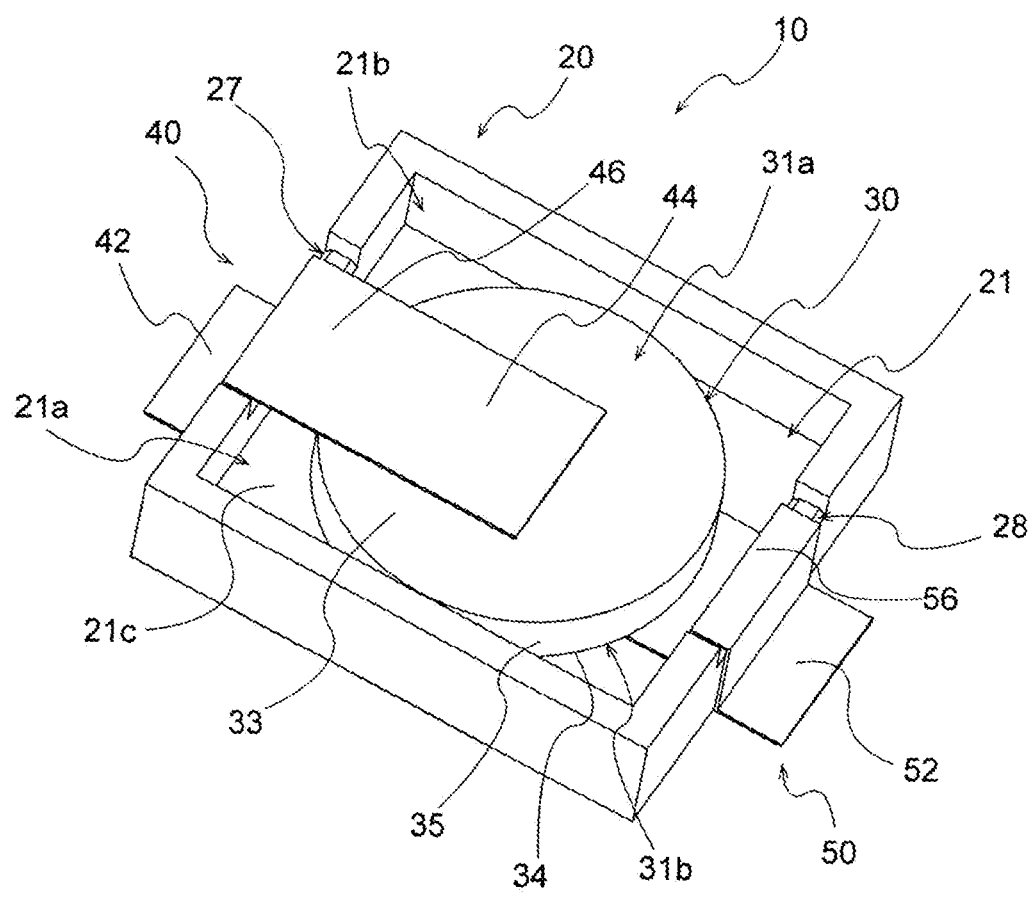
FIG. 2 is a schematic perspective diagram of the electronic component shown in FIG. 1 before a case cover is installed.

Note that, as shown in FIG. 2, when explaining the electronic component 10, a normal direction to the bottom face 21c of the accommodation part 21 is Z-axis direction, Y-axis direction is a direction perpendicular to Z-axis direction and connecting the first mounting part 42 and the second mounting part 52 with a minimum distance, and a direction perpendicular to Y-axis direction and Z-axis direction is X-axis direction.

As shown in FIG. 2, the case 20 has the accommodation part 21 having a recessed shape, and accommodates the ceramic element 30 and so on in the accommodation part 21. The accommodation part 21 has a rectangular shape slightly smaller than the outer shape of the case 20 when viewed from the opening 21a side of the accommodation part 21. The accommodation part 21 includes a space of approximately rectangular parallelepiped shape which is formed at the inside of the case 20. The opening 21a of the accommodation part 21 is formed to the case 20 so that the direction facing the upper side of the electronic component 10 (the opposite side of the mounting face) is opened.

Figure 4:
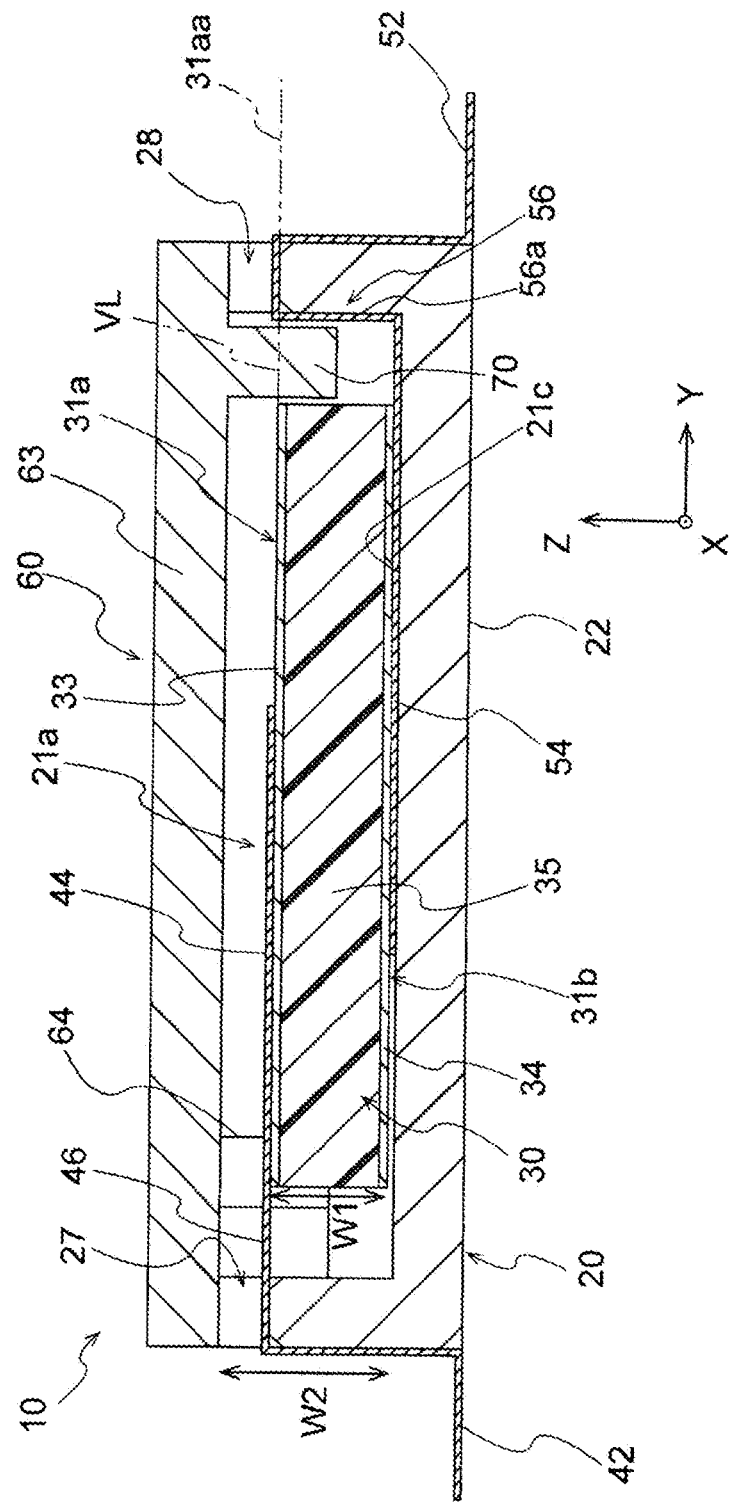
FIG. 4 is a cross section of the electronic component shown in FIG. 1.

At the opening edge surrounding the opening 21a of the case 20, step parts are formed to two places where the heights are lower than other parts. Due to these step parts, the opening 21a is expanded to part of the side surface of the case 20. The step parts of the case 20 form a first space 27 and a second space 28 to which the first metal terminal 40 or the second metal terminal 50 is inserted when the case cover 60 is installed to the case 20 as shown in FIG. 4.

Figure 3:
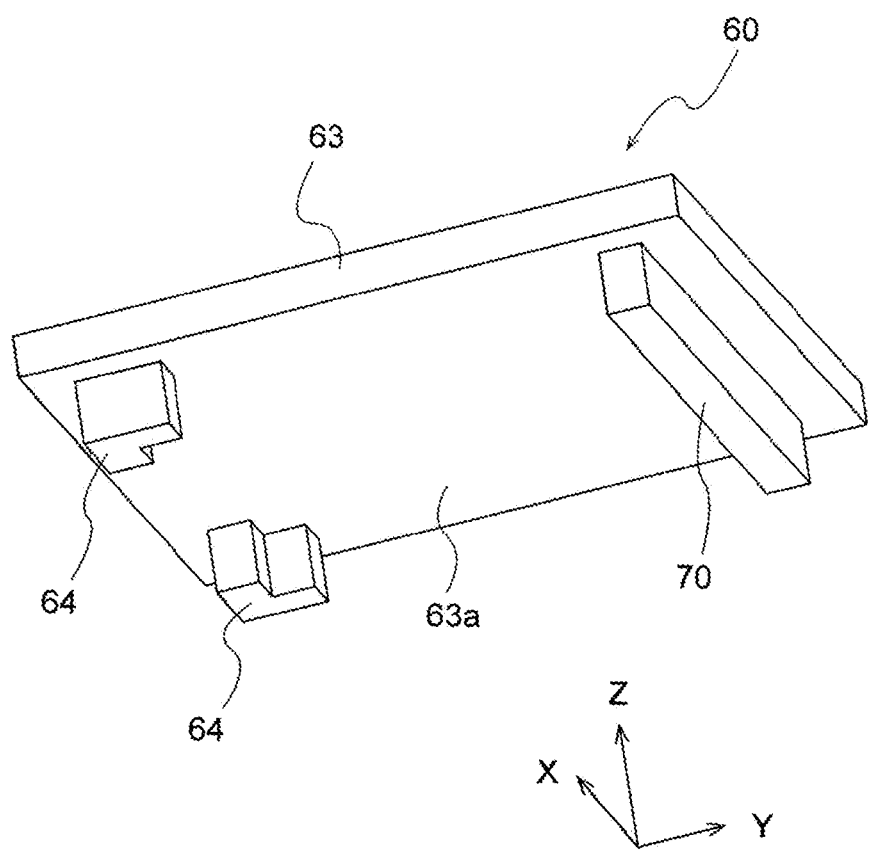
FIG. 3 is a schematic perspective diagram of the electronic component shown in FIG. 1 viewing from diagonally below.

FIG. 3 is a schematic perspective diagram of the case cover 60 viewing from below (viewing from the accommodation part 21 side). As shown in FIG. 3, the case cover 60 is arranged to the accommodation part 21 side which is the opposite side of the mounting face side of the case 20, and at least partially covers the opening 21a of the accommodation part 21 as shown in FIG. 4. The case cover 60 has a case cover main part 63 which is a flat rectangular shape. As understood from FIG. 1 and FIG. 3, the case cover main part 63 has roughly the same shape as the case 20 which are rectangular shapes when viewed from above (viewing from Z-axis positive direction).

At the case cover main part 63, a projection 64 is formed which is projecting downward from the surface of the case cover main part 63 facing the accommodation part 21. The projection 64 is formed so that it matches each of a plurality of corner parts 21b of the accommodation part 20 (in the example shown in FIG. 3, it is two). The projection 64 functions as a guide for adjusting the position when assembling the case cover 60 to the case 20.

As shown in FIG. 3, an insulation member 70 is provided at a case cover lower face 63a of the case cover main part 63 which is facing the accommodation part 21. The insulation member 70 projects downwards from the case cover lower face 63a as similar to the projection 64. The position of the insulation member 70 in relative to other members will be described in below.

FIG. 4 is a cross section of the electronic component 10. As shown in FIG. 4, the case 20 has a case lower face 22 which is facing to the opposite direction of the opening 21a of the accommodation part 21. The case lower face 22 is roughly parallel to the lower face of the first mounting part 42 of the first metal terminal 40 and the lower face of the second mounting par 52 of the second metal terminal 50; and the case lower face 22 is arranged at the same height as the lower face of the first mounting part 42 of the first metal terminal 40 and the lower face of the second mounting part 52 of the second metal terminal 50, or the case lower face 22 may be arranged at slightly upper side than these. Note that, the case lower face 22 may be arranged at different heights from the lower face of the first mounting part 42 of the first metal terminal 40 and the lower face of the second mounting par 52 of the second metal terminal 50; and the relative position in Z-axis direction of the case lower face 22 and the lower face of the first mounting part 42 of the first metal terminal 40 and the lower face of the second mounting part 52 of the second metal terminal 50 are not particularly limited.

As shown in FIG. 2, the ceramic element 30 is arranged in the accommodation part 21 of the case 20. The ceramic element 30 has a first main face 31a and the second main face 31b facing each other, and the ceramic element 30 has an outer shape of approximately a circular disk shape. Note that, the ceramic element 30 may be in any shape other than the circular disk shapes such as an oval disk shape, a rectangular plate shape, and so on. Note that, the first main face 31a and the second main face 31b are a pair of faces (planes) having the largest areas in the ceramic element 30. Also, as shown in FIG. 4, regarding the ceramic element 30 of the electronic component 10, among the two main faces, the first main face 31a is facing to the opening 21a side (upper direction), and the second main face 31b is facing to the opposite side of the opening 21a (lower direction, the side of the bottom face 21c). Note that, regarding other embodiments such that the opening 21a of the case 20 is facing to the different directions from the electronic component 10 according to the present embodiment, the direction of each main face may be different from that of the first embodiment.

As shown in FIG. 4, the ceramic element 30 has a first electrode 33 formed to the first main face 31a, a second electrode 34 formed to the second main face 31b, and a dielectric part 35 placed between the first electrode 33 and the second electrode 34. A material of the dielectric part 35 is not particularly limited, and for example, it may be dielectric materials such as calcium titanate, strontium titanate, barium titanate, a mixture of these, and so on. Note that, the ceramic element 30 is not particularly limited to capacitors in which the dielectric part 35 is placed between the first electrode 33 and the second electrode 34. For example, a ceramic element may be a varistor, a thermistor, and the like in which semiconductor ceramics are placed between a first electrode and a second electrode.

Materials of the first electrode 33 and the second electrode 34 are not particularly limited, and usually, copper, copper alloy, nickel, nickel alloy, and the like may be used; and also, silver, and an alloy of silver and palladium, and the like can be used as well. The thicknesses of the first electrode 33 and the second electrode 34 are not particularly limited, and usually the thicknesses may be within a range of 10 to 50 μm or so. Note that, the surfaces of first and second electrodes 33 and 34 may have metal coatings made by using at least one selected from Ni, Cu, Sn, and so on.

As shown in FIG. 4, an accommodation depth W2, which is a distance from the opening 21a to the bottom face 21c of the accommodation part 21 of the case 20, is larger than an element thickness W1 which is a distance between the first main face 31a and the second main face 31b of the ceramic element 30. Thereby, the electronic component 10 accommodates the entire ceramic element 30 in the accommodation part 21 without exposing part of the ceramic element 30 from the opening 21a of the accommodation part 21. Also, such electronic component 10 can simplify the shape of the case cover 60. Also, the entire ceramic element 30 can be covered by the mold resin in case the accommodation part 21 is filled with the mold resin.

As shown in FIG. 2, the electronic component includes the first metal terminal 40 and the second metal terminal 50 which are a pair of metal terminals. The first metal terminal 40 and the second metal terminal 50 are arranged to the electronic component 10 by taking space in between each other, thus these two are electrically insulated. The first metal terminal 40 and the second metal terminal 50 are, for example, formed by mechanically processing a conductive metal plate, and a method of forming the metal terminals 40 and 50 are not limited to this.

As shown in FIG. 2 and FIG. 4, the first metal terminal 40 has a first electrode connecting part 44 connecting to the first electrode 33, a first mounting part 42 exposed out of the accommodation part 21 through the opening 21a (including the first space 27 which is part of the opening 21a), and a first terminal arm part 46 connecting the first electrode connecting part 44 and the first mounting part 42. Regarding the first metal terminal 40, the first electrode connecting part 44 and the first terminal arm part 46 (including the part arranged in the first space 27) are arranged to the accommodation part 21 and the opening 21a, and the first mounting part 42 is exposed out of the accommodation part 21 and the opening 21a.

As shown in FIG. 4, the first mounting part 42 has an approximately an L-like shape. The first mounting part 42 extends downward along the outer surface of the case 20 by perpendicularly bending from the first terminal arm part 46, and then bends roughly perpendicularly from the position slightly lower than the case lower face 22. The tip of the first mounting part 42 extends along the direction approximately parallel to the case lower face 22 and in a direction moving away from the case 20. Note that, as the shape of the first mounting part 42, it is not limited to the one shown in FIG. 4, and the tip of the first mounting part 42 may be facing the case lower face 22.

As shown in FIG. 2 and FIG. 4, in the first metal terminal 40, the parts corresponding to the first electrode connecting part 44 and the first terminal arm part 46 have shapes which are approximately a flat rectangular plate shape. Among the parts having flat plate shapes which matches the first electrode connecting part 44 and the first terminal arm part 46, a part facing the first main face 31a of the ceramic element 30 is the first electrode connecting part 44. Also, the first terminal arm part 46 is a part which extends along an extending face of the first main face 31a and to the first space 27 from the first electrode connecting part 44.

Figure 5:
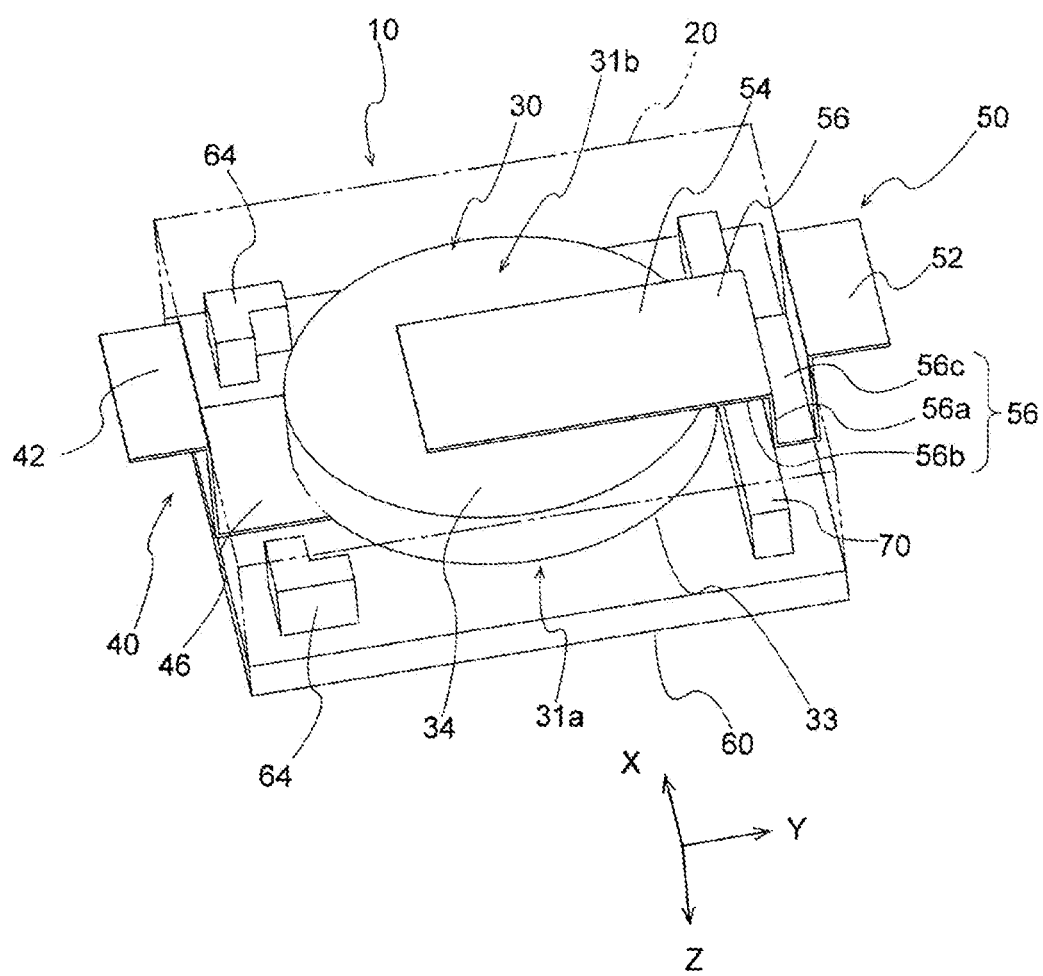
FIG. 5 is a partial perspective diagram showing the inside of a case included in the electronic component shown in FIG. 1.

FIG. 5 is a partial perspective view showing the inside of the case 20 of the electronic component 10; and FIG. 5 is a view from below showing the case 20 through the electronic component 10. As shown in FIG. 5, the second metal terminal 50 has a second electrode connecting part 54 connecting to the second electrode part 34 of the ceramic element 30, the second mounting part 52 exposed out of the accommodation part 21 through the opening 21a (including a second space 28 which is part of the opening 21a) (see FIG. 2), and a second terminal arm part 56 connecting the second electrode connecting part 54 and the second mounting part 52. Regarding the second metal terminal 50, the second electrode connecting part 54 and the second terminal arm part 56 (including the part that the second space 28 is arranged) are arranged to the accommodation part 21 and the opening 21a, and the second mounting part 52 is exposed out of the accommodation part 21 and the opening 21a.

As shown in FIG. 4, the second mounting part 52 has an approximately an L-like shape, and is arranged roughly symmetrical to the first mounting part 42. The second mounting part 52 extends downward along the outer surface of the case 20 by perpendicularly bending from the second terminal arm part 56, and then bends roughly perpendicularly from the position slightly lower than the case lower face 22. The tip of the second mounting part 52 extends along the direction approximately parallel to the case lower face 22 and in a direction moving away from the case 20 (the opposite direction to the first mounting part 42). As similar to the first mounting part 42, the shape of the second mounting part 52 is not limited to the shape shown in FIG. 4.

As shown in FIG. 4 and FIG. 5, the part corresponding to the second electrode connecting part 54 of the second metal terminal 50 has a flat plate shape, and the part corresponding to the second terminal arm part 56 includes two bent portions. The second electrode connecting part 54 is facing the second main face 31b of the ceramic element 30. Also, the second electrode connecting part 54 is facing the bottom face 21c which configures the bottom face of the accommodation part 21. Therefore, the second electrode connecting part 54 is held from upper and lower directions by the bottom face 21c of the accommodation part 21 and the second main face 31b of the ceramic element 30.

As shown in FIG. 4, the second terminal arm part 56 of the second metal terminal 50 has three portions as described in below. A first portion 56b of the second terminal arm part 56 extends along the extending face of the second main face 31b and the bottom face 21c towards an inner surface of the case 20 from the second electrode connecting part 54. Also, a rising part 56a is a second portion of the second terminal arm part 56 which is bent roughly perpendicularly from the first portion and follows the extending face of the second main face 31b, and extends upwards from the bottom face 21c to upper side of the opening 21a. Also, as shown in FIG. 4 and FIG. 5, a third portion 56c of the second terminal arm part 56 is arranged at the second space 28 by bending roughly perpendicularly from the rising part 56a. The tip of the third portion 56c connects to the second mounting part 52.

Materials of the first metal terminal 40 and the second metal terminal 50 are not particularly limited as long as conductive metals are used; and for example, iron, nickel, copper, silver, alloys of these, and so can be used. Also, the first metal terminal 40 and the second metal terminal 50 may have metal coatings such as Ni, Sn, Cu, and the like on the surfaces.

As shown in FIG. 1, the case cover 60 is arranged to the opposite side of the case lower face 22 of the case 20, and covers the opening 21a of the accommodation part 21 (see FIG. 2). FIG. 5 is a perspective view of the case cover 60 viewing from below. As shown in FIG. 5 and FIG. 2, the case cover 60 has a case cover main part 63 of a rectangular parallelepiped shape which is roughly the same as the case 20 when viewed from above, and a plurality of projections 64 (in the present embodiment the number is two) projecting downward from the corner parts of the case cover lower face 63a facing to the opening 21a of the case 20.

The electronic component 10 can suitably protect the members such as the ceramic element 30 arranged in the accommodation part 21 by sealing the accommodation part 21 with the case cover 60. The opening edge of a frame-like shape surrounding the opening 21a shown in FIG. 2 connects with the case cover lower face 63a of the case cover main part 63 shown in FIG. 3, and the case cover 60 covers the opening 21a of the accommodation part 21. Note that, between the case cover 60 and the case 20, the first space 27 where the first metal terminal 40 passes through and the second space 28 where the second metal terminal 50 passes through are formed.

The projections 64 of the case cover 60 shown in FIG. 3 are provided so to correspond with the plurality of corner parts 21b (see FIG. 2) of the opening 21a shown in FIG. 2; and as shown in FIG. 5, when the case cover 60 covers the opening 21a, the projections 64 are inserted into the accommodation part 21. The case cover 60 including the projections 64 can be accurately and easily positioned with respect to the case 20, and the case cover 60 can be firmly fixed to the case 20.

As shown in FIG. 3, the insulation member 70 is provided to the case cover lower face 63a of the case cover 60. Since the case cover 60 is integral with the insulation member 70, the electronic component 10 having such configuration can easily arrange the insulation member 70 to an appropriate position of the accommodation part 21. Note that, the insulation member 70 is not limited to those integrally formed to the case cover 60, and for example, the insulation member 70 may be a member connecting to the case 20, and also the insulation member 70 may be a member which is separate of other members.

As shown in FIG. 3, at least part of the insulation member 70 of the electronic component 10 is connected to the case cover 60 (in FIG. 3, the entire insulation member 70 is connected to the case cover 60). As shown in FIG. 4, the insulation member 70 projects downward (toward the bottom face 21c side) from the case cover lower face 63a of the case cover 60, and the insulation member 70 is arranged inside the accommodation part 21. As shown in FIG. 4 and FIG. 5, in the accommodation part 21, the insulation member 70 is arranged between the first electrode 33 of the ceramic element 30 and the second terminal arm part 56 of the second metal terminal 50.

As shown in FIG. 4, preferably the insulation member 70 is arranged in the accommodation part of the case 20 so that the insulation member 70 and the extending face 31aa of the first main face 31a of the ceramic element 30 intersect. Further, preferably the insulation member 70 crosses the virtual line VL (it matches the extending face 31aa in FIG. 4) which is the minimum distance connecting the first electrode 33 and the second terminal arm part 56 (particularly the rising part 56a) along the extending face 31aa of the first main face 31a. By configuring as such, the insulation property can be effectively enhanced between the first electrode 33 and the second terminal arm part 56 which is electrically connected to the second electrode 34.

As shown in FIG. 5, the second metal terminal 50 electrically connecting to the second electrode 34 is exposed out of the accommodation part 21 through the opening 21a (including the second space 28). Therefore, in the electronic component 10, the rising part 56a or the third portion 56c of the second terminal arm part 56 is arranged near the first electrode 33 of the ceramic element 30 facing to the opening 21a side. However, in the electronic component 10, the insulation member 70 is arranged between the first electrode 33 and the second terminal arm part 56 (particularly the rising part 56a), thus sufficient insulation distance between the first electrode 33 and the second terminal arm part 56 can be secured even in a small accommodation part 21. Also, by having the rising part 56a, a through hole for placing the second metal terminal 50 to the outside of the case 22 will not be necessary at the bottom part of the case 22. Hence, in case resin molding is carried out, such electronic component 10 can prevent the leakage of the resin from the bottom of the case 20.

Note that, due to the insulation member 70 being connected with the case cover lower face 63a as shown in FIG. 5, and one surface of the insulation member 70 facing the rising part 56a as shown in FIG. 4, and the other surface facing the lateral side surface of the ceramic element 30 to which the first electrode 33 being arranged at the end; such configurations are also preferable from the point of enhancing the insulation property. Note that, the shape and the arrangement of the insulation member 70 are not limited to those shown in FIG. 4 and FIG. 5.

The accommodation part 21 of the case 20 shown in FIG. 2 and FIG. 4 may be filled with a mold resin which fills the space between the inner surface of the accommodation part 21 (including the bottom face 21c) and also the space between the ceramic element 30 and the metal terminals 40 and 50. Thereby, the strength and the insulation property of the electronic component 10 can be enhanced. Note that, the accommodation part 21 does not necessarily have to be filled with the resin; and as shown in FIG. 2, a space may be formed between the inner surface of the accommodation part 21 and the ceramic element 30 and the metal terminals 40 and 50.

For example, the case 20, the case cover 60, and the insulation member 70 can be produced by injection molding using a resin. Note that, materials of the case 20, the case cover 60, and the insulation member 70 are not limited to resin. The insulation member 70 can be made of an insulation material such as resin and so on, and it may also be made by coating the conductive material with the insulation material such as a resin and so on.

For example, the electronic component 10 shown in FIG. 1 to FIG. 5 can be produced through below described steps. First, the ceramic element 30, the first metal terminal 40, and the second metal terminal 50 are prepared; and the first metal terminal 40 and the second metal terminal 50 are connected to the ceramic element 30. The first metal terminal 40 and the second metal terminal 50 can be connected to the ceramic element 30 by using solder, conductive adhesives, and the like.

Next, the first metal terminal 40, the second metal terminal 50, and the ceramic element 30 integrally form an intermediate product, then this is arranged in the accommodation part 21 of the case 20. Then, the opening 21a is closed using the case cover 60. At this time, the mold resin is placed inside the accommodation part 21 before closing the opening 21a using the case cover 60, then the mold resin is cured after the case cover 60 is installed. Thereby, the case cover 60 and the case 20 are firmly fixed via the mold resin. As such, the electronic component 10 shown in FIG. 1 can be produced.

Note that, the step of connecting the first metal terminal 40 and the second metal terminal 50 to the ceramic element 30 may be carried out while the mounting base parts 42 and 52 of the first metal terminal 40 and the second metal terminal 50 are not bent.

As such, the electronic component 10 shown in FIG. 1 to FIG. 5 accommodates the ceramic element 30 in the accommodation part 21 of the case 20, hence, there is no need of a step of molding by using the exterior material after arranging the ceramic element 30 and so on in the cavity for resin molding. Thus, a good productivity is achieved.

The electronic component 10 can accommodate the ceramic element 30 in the case 20, thus as long as it can fit inside the case 20, the size of the ceramic element 30 can be flexibly changed. Also, the first mounting part 42 and the second mounting part 52 are parallel to the first main face 31a and the second main face 31b of the ceramic element 30. Thus, the electronic component 10 is advantageous from the point of lowering its height and it is suited for surface mounting.

Also, regarding the electronic component 10, by having the insulation member 70, a preferable insulation property can be secured while ensuring a good productivity and compactness. Note that, when the electronic component 10 has the mold resin arranged in the accommodation part 21, the insulation member 70 can be arranged in a way that a long insulation distance is provided between the first electrode 33 and certain areas which are difficult to cover with the mold resin (for example, the third portion 56c).

Second Embodiment

Figure 6:
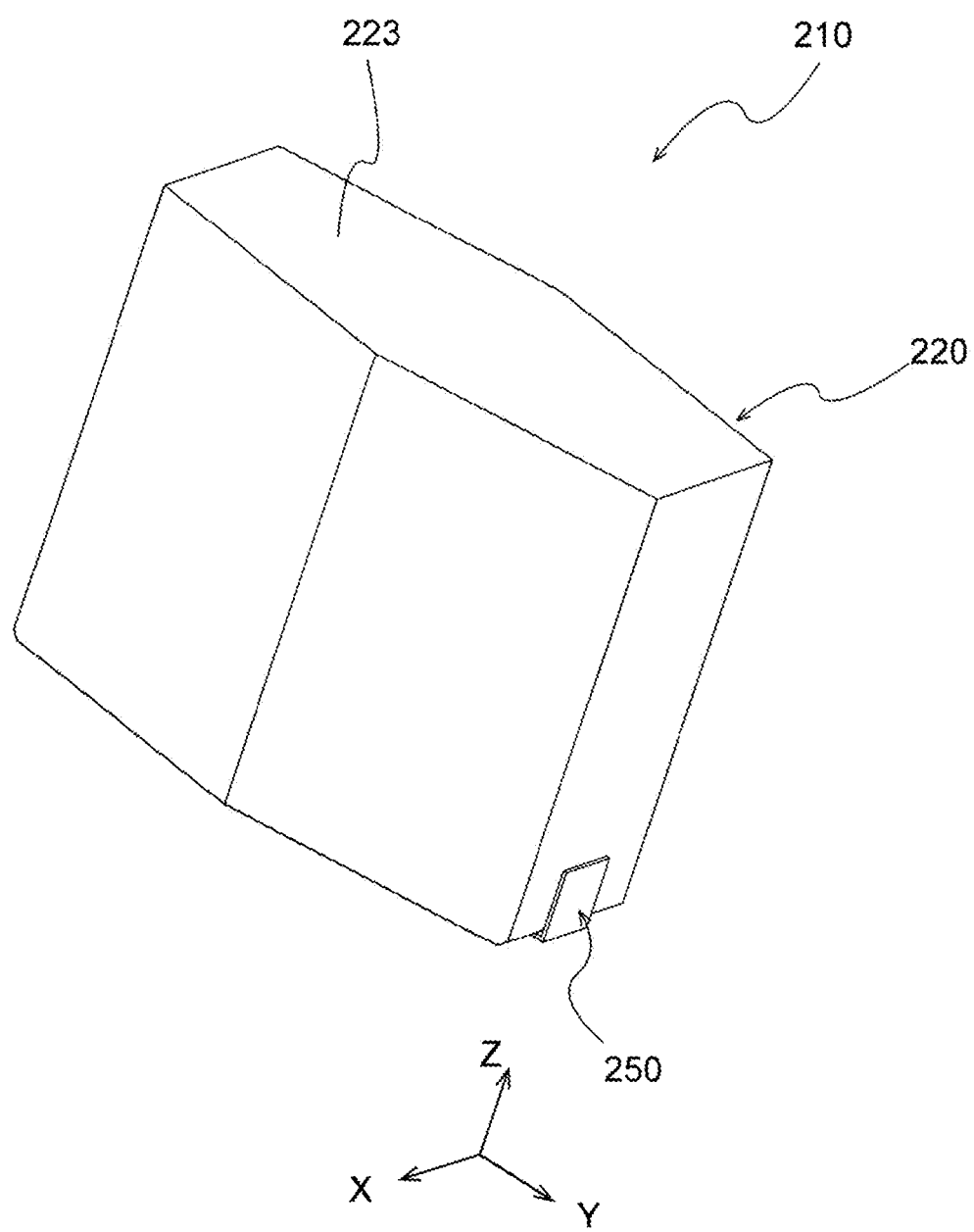
FIG. 6 is a schematic perspective diagram of an electronic component according to the second embodiment viewing from diagonally above.
Figure 7:
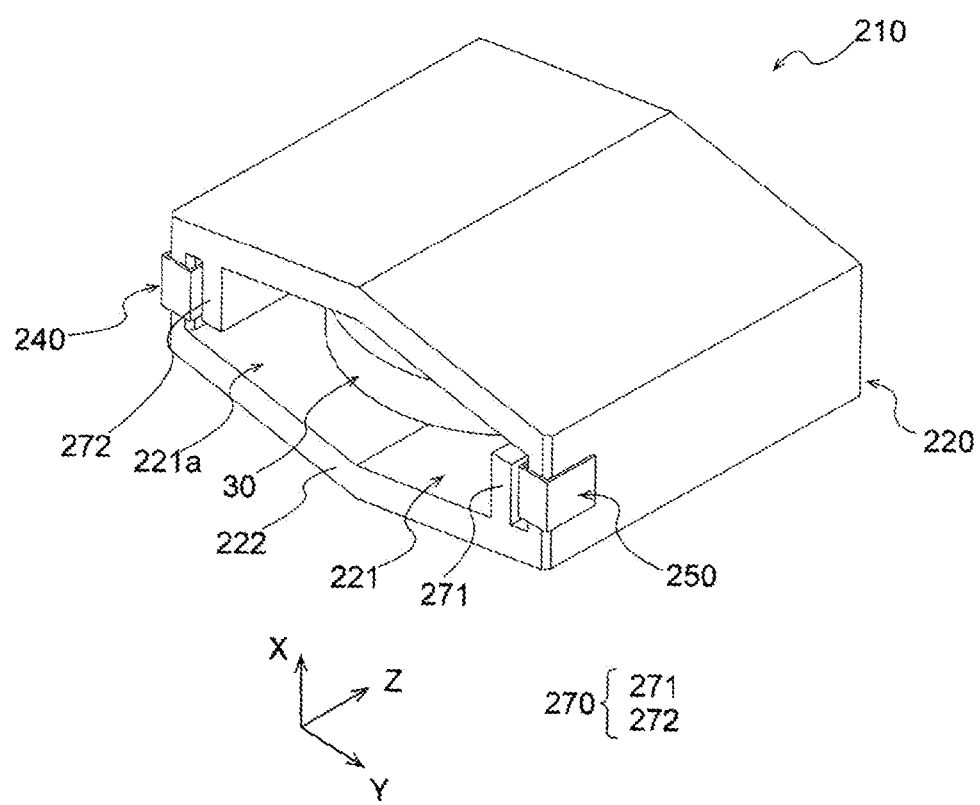
FIG. 7 is a schematic perspective view of the electronic component shown in FIG. 6 viewing from diagonally below.

FIG. 6 is a schematic perspective view of an electronic component 210 according to the second embodiment viewing from above. FIG. 7 is a schematic perspective view of the electronic component 210 viewing from below. As shown in FIG. 6 and FIG. 7, the electronic component 210 has the ceramic element 30 and so on which are the same as the electronic component 10, however the shapes of the case 220, the first metal terminal 240, and the second metal terminal 250, and so on are different from those of the electronic component 10 shown in FIG. 1. Regarding the electronic component 210, parts which are different from the first embodiment will be mainly described, and for parts which are the same as the first embodiment are given the same reference numbers and the explanation will be omitted.

As shown in FIG. 6 and FIG. 7, a case 220 of the electronic component 210 has an outer shape of roughly hexagonal prism shape which includes a pair of base faces which are approximately parallel to each other, and six lateral side faces roughly perpendicular to the base faces. As shown in FIG. 7, at the inside of the case 220, an accommodation part 221 having an opening 221a is formed. As shown in FIG. 6, an upper base 223 side of the case 220 does physically have a base face, and at a lower bottom side of the case 220, the opening 221a is formed.

Figure 8:
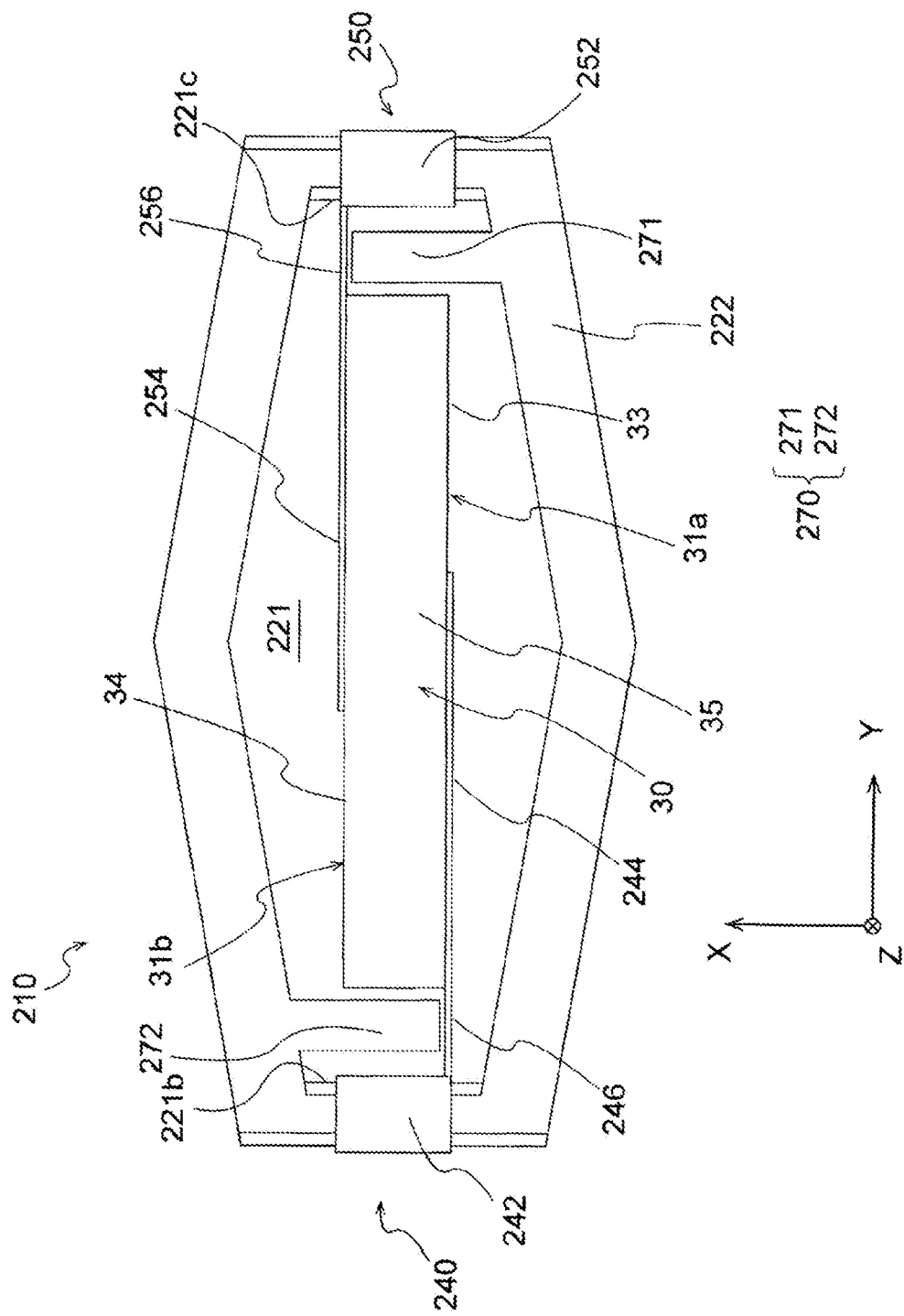
FIG. 8 is a bottom view of the electronic component shown in FIG. 6.

FIG. 8 is a bottom view of the electronic component 210 shown in FIG. 6 and FIG. 7. As shown in FIG. 8, the ceramic element 30 is arranged in the accommodation part 221. This ceramic element 30 is the same as the ceramic element 30 installed to the electronic component 10 shown in FIG. 2. That is, the ceramic element 30 has a first electrode 33 formed to the first main face 31a, a second electrode 34 formed to the second main face 31b, and a dielectric part 35 placed between the first electrode 33 and the second electrode 34.

Figure 9:
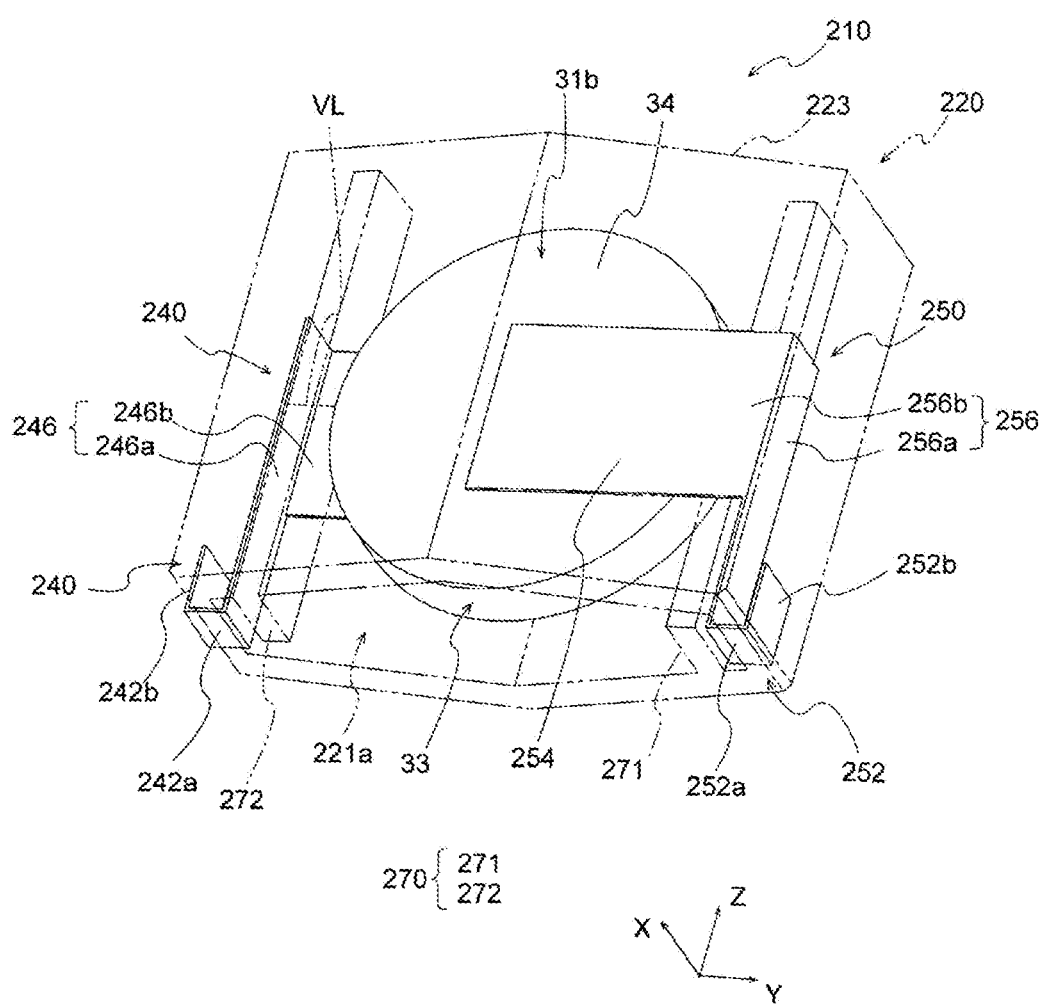
FIG. 9 is a partial perspective diagram showing the inside of a case included in the electronic component shown in FIG. 6.

As shown in FIG. 7 and FIG. 9, the first main face 31a and the second main face 31b of the ceramic element 30 are facing to the direction roughly perpendicular to the opening 221a of the case 220. Also, the case 220 has an opening edge 222 surrounding the opening 221a of the accommodation part 221. A first mounting part 242 of a first metal terminal 240 and a second mounting part 252 of a second metal terminal 250 are arranged to the opening edge 222.

The electronic component 210 has the first main face 31a and the second main face 31b of the ceramic element 30 facing the direction approximately perpendicular to the opening 221a. By arranging the mounting parts 242 and 252 on the opening edge 222, a mounting area can be narrowed down.

Note that, the electronic component 210 is a polygonal prism shape of which the six outer lateral side surfaces of the case 220 are not parallel to either the first main face 31a or the second main face 31b; and even when the mounting area is small, the electronic component 210 has good mounting stability. Note that, the shape of the case 220 is not limited to the hexagonal prism shape, and it may be any different shapes from that shown in FIG. 6 to FIG. 9 such as a quadrangular prism shape, an octagonal prism shape, and so on.

FIG. 9 is a perspective view of the case 220 of the electronic component 210, and it is showing the inside of the accommodation part 221 of the electronic component 210. As shown in FIG. 9, the distance between the opening 221a of the case 220 and the upper base 223 of the accommodation part 221 is larger than a diameter of the ceramic element 30. Thereby, in the electronic component 210, the entire ceramic component 30 can be placed inside the accommodation part 221 without partially exposing the ceramic component 30 from the opening 221a of the accommodation part 221. Also, the mold resin may fill the accommodation part 221, and in such case, the mold resin covers the entire ceramic element 30.

As shown in FIG. 7 and FIG. 8, the case 220 does not have a case cover (see FIG. 1) to cover the opening 221a. Therefore, in the electronic component 210, as shown in FIG. 7, at least part of the opening edge 222 of the case 220 can be seen from below, that is, an area other than the parts where the first mounting part 242 and the second mounting part 252 of the opening edge 222 can be seen from below.

As such, since the case 20 has a simple shape which does not have a lid or a case cover, the electronic component 210 can be produced efficiently.

Note that, as shown in FIG. 9, when explaining the electronic component 210, a normal direction to the opening 221a and the opening edge 222 of the accommodation part 221 is Z-axis direction; Y-axis direction is a direction perpendicular to Z-axis direction and is a direction connecting the first mounting part 242 and the second mounting part 252 with a minimum distance; and a direction perpendicular to Y-axis direction and Z-axis direction is X-axis direction.

As shown in FIG. 8 and FIG. 9, the electronic component 210 includes the first metal terminal 240 and the second metal terminal 250 which are a pair of metal terminals. The first metal electrode 240 and the second metal electrode 250 are arranged to the electronic component 210 by taking space in between each other, thus these two are electrically insulated. As similar to the metal terminals 40 and 50 shown in FIG. 2, the first metal terminal 240 and the second metal terminal 250 are, for example, formed by mechanically processing a conductive metal plate. Note that, a method of forming the metal terminals 240 and 250 may be methods other than mechanical processing of the metal plates.

As shown in FIG. 8 and FIG. 9, the first metal terminal 240 has a first electrode connecting part 244 connecting to the first electrode 33, a first mounting part 242 exposed out of the accommodation part 221 through the opening 221a, and a first terminal arm part 246 connecting the first electrode connecting part 244 and the first mounting part 242. Regarding the first metal terminal 240, the first electrode connecting part 244 and the first terminal arm part 246 are arranged to the accommodation part 221 and the opening 221a, and the first mounting part 242 exposes out of the accommodation part 221 and the opening 221a.

As shown in FIG. 9, the first mounting part 242 has roughly a L-like shape. That is, the first mounting part 242 has a first mounting base part 242a arranged to the opening edge 222, and a first folded part 242b which is bent perpendicularly from a tip of the first mounting base part 242a and extending upwards. The first folded part 242b is extending upwards along the outer surface of the case 220.

As shown in FIG. 8 and FIG. 9, in the first metal terminal 240, the part corresponding to the first electrode connecting part 244 has a flat plate shape, and the part corresponding to the second terminal arm part 245 includes one bent portion. As shown in FIG. 8, the first electrode connecting part 244 faces the first main face 31a of the ceramic element 30.

The first terminal arm part 246 of the first metal terminal 240 has a first portion 246b and a second portion 246a being perpendicular to each other. As shown in FIG. 8, the first portion 246b of the first terminal arm part 246 extends along the extending face of the first main face 31a towards the inner surface (first inner surface 221b) of the accommodation part 221 from the first electrode connecting part 244. As shown in FIG. 9, the second portion 246a of the first terminal arm part 246 is bent roughly perpendicularly from the first portion 246b extending along the extending face of the first main face 31a, and extends from the inside of the accommodation part 221 towards the opening 221a at lower side, then the tip of the second portion 246a connects to the first mounting part 242.

As shown in FIG. 8 and FIG. 9, the second metal terminal 250 has the same shape as the first metal terminal 240, and it is arranged roughly symmetrical to the first metal terminal 240. That is, the second metal terminal 250 has a second electrode connecting part 254 connecting to the second electrode 34, a second mounting part 252 exposed out of the accommodation part 221 through the opening 221a, and a second terminal arm part 256 connecting the second electrode connecting part 254 and the second mounting part 252. In the second metal terminal 250, the second electrode connecting part 254 and the second terminal arm part 256 are arranged to the accommodation part 221 and the opening 221a, and the second mounting part 252 is exposed out of the accommodation part 221 and the opening 221a.

As shown in FIG. 9, the second mounting part 252 has roughly a L-like shape. As similar to the first mounting part 242, the second mounting part 252 has a second mounting base part 252a arranged to the opening edge 222, and a second folded part 252b arranged to the outer surface of the case 220.

As similar to the first terminal arm part 246 of the first metal terminal 240, the second terminal arm part 256 of the second metal terminal 250 has a first portion 256b and a second portion 256a which are extending roughly perpendicular to each other. As shown in FIG. 8, the first portion 256b of the second terminal arm part 256 extends along the extending face of the second main face 31b towards the inner surface (second inner surface 221c) of the accommodation part 221 from the second electrode connecting part 254. As shown in FIG. 9, the second portion 256a of the second terminal arm part 256 is bent roughly perpendicularly from the first portion 256b extending along the extending face of the second main face 31b, and extends from the inside of the accommodation part 221 towards the opening 221a at lower side, then the tip of the second portion 256a connects to the second mounting part 252.

As shown in FIG. 8 and FIG. 9, the electronic component 210 has an insulation member 270 which at least part of it is connected to the case 220 (in the second embodiment, the entire insulation member 270 is connected to the case). As shown in FIG. 9, the insulation member 270 has a first portion 271 arranged between the first electrode 33 and the second terminal arm part 256, and a second portion 272 arranged between the second electrode 34 and the first terminal arm part 246.

As shown in FIG. 8, the first portion 271 of the insulation member 270 projects out from the inner surface of the accommodation part 221 facing the first main face 31a towards the inside of the accommodation part 221 (particularly towards the first portion 246b of the first terminal arm part 246). Also, the second portion 272 of the insulation member 270 projects out from the inner surface of the accommodation part 221 facing the second main face 31b towards the inside of the accommodation part 221 (particularly towards the first portion 256b of the second terminal arm part 256).

Regarding the electronic component 210 in which the opening 221a is perpendicular to the first main face 31a and the second main face 31b, there may be an area where the first terminal arm part 246 and the second terminal arm part 256 are arranged close to the second electrode 34 or the first electrode 33 which is at the opposite side in the accommodation part 221. However, in the electronic component 210, the insulation properties between the first terminal arm part 246 and the second electrode 34 and between the second terminal arm part 256 and the first electrode 33 can be enhanced, since the insulation member 270 has the first portion 271 and second portion 272.

Also, as shown in FIG. 8, the first portion 271 of the insulation member 270 is preferably arranged in a way that the first portion 271 and the extending face of the first main face 31a of the ceramic element 30 intersect; and the second portion 272 of the insulation member 270 is preferably arranged in a way that the second portion 272 and the extending face of the second main face 31b of the ceramic element 30 intersect. Further, as shown in FIG. 9, the second portion 272 of the insulation member 270 crosses the virtual line VL which is the minimum distance connecting the second electrode 34 and the second portion 246a along the extending face of the second main face 31b. The first portion 271 of the insulation member 270 is the same as the second portion 272.

As such, regarding the electronic component 210, by arranging the insulation member 270 to the predetermined position, sufficient insulation distances between the first electrode 33 and the second terminal arm part 256 and between the second electrode 34 and the first terminal arm part 246 can be secured even in the accommodation part 221 with small space. Note that, the case 220 and the insulation member 270 can be produced by injection molding using a resin as similar to the case 20 and the case cover 60 (see FIG. 1). Furthermore, parts of the electronic component 210 which are in common with the electronic component 10 exhibit the same effects as the electronic component 10.

Third Embodiment

Figure 10:
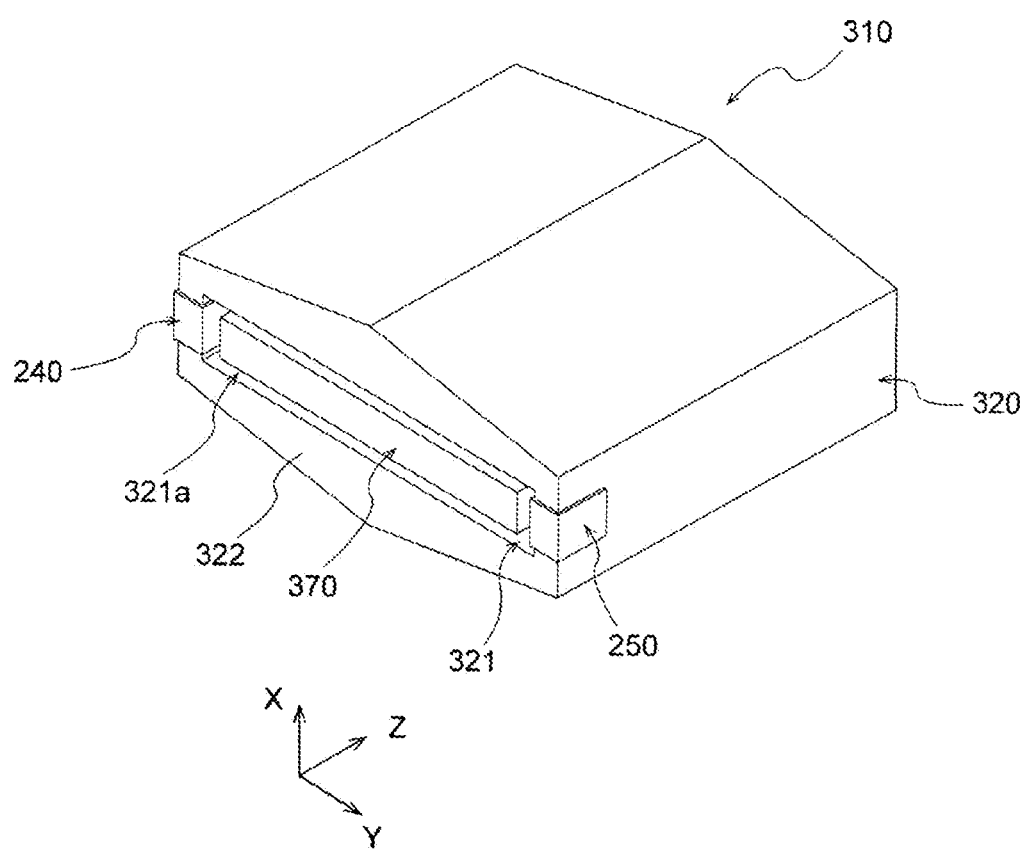
FIG. 10 is a schematic perspective diagram showing an electronic component according to the third embodiment viewing from diagonally below.
Figure 11:
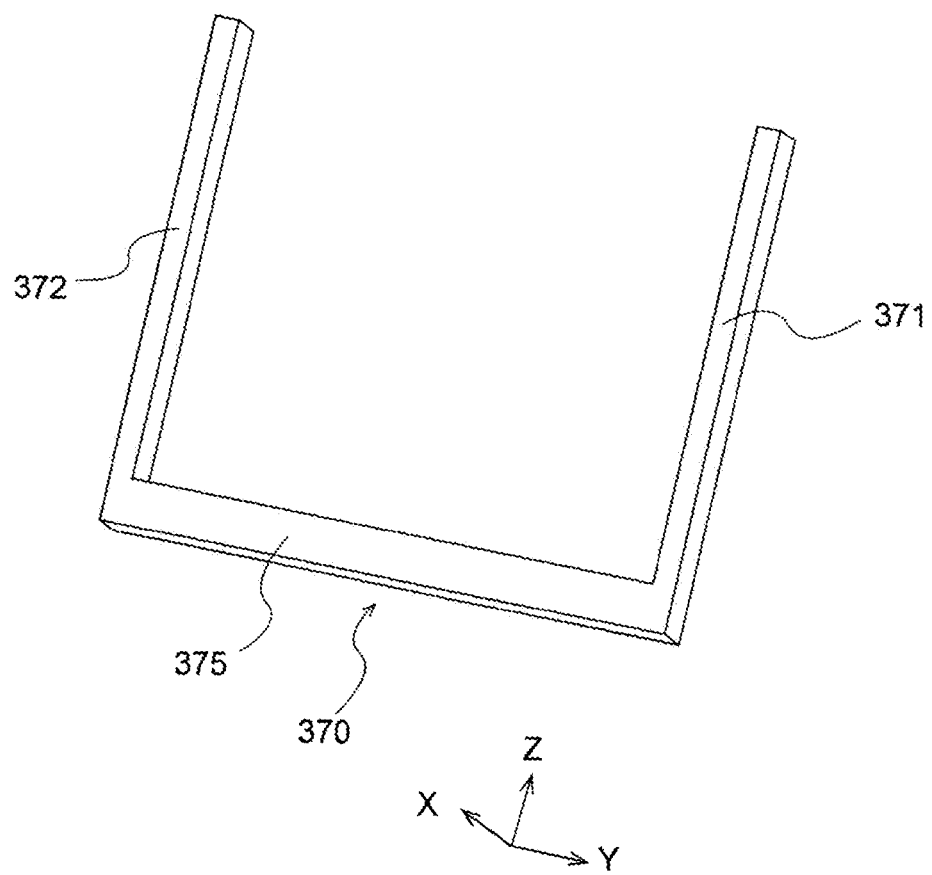
FIG. 11 is a schematic perspective view showing an insulation member included in the electronic component shown in FIG. 10.

FIG. 10 is a schematic perspective view of an electronic component 310 according to the third embodiment viewing from below. FIG. 11 is a perspective view of an insulation member 370 included in the electronic component 310. Also, FIG. 12 is a perspective view of a case 320 of the electronic component 310, and it is showing the inside of an accommodation part 321 of the electronic component 310.

Figure 12:
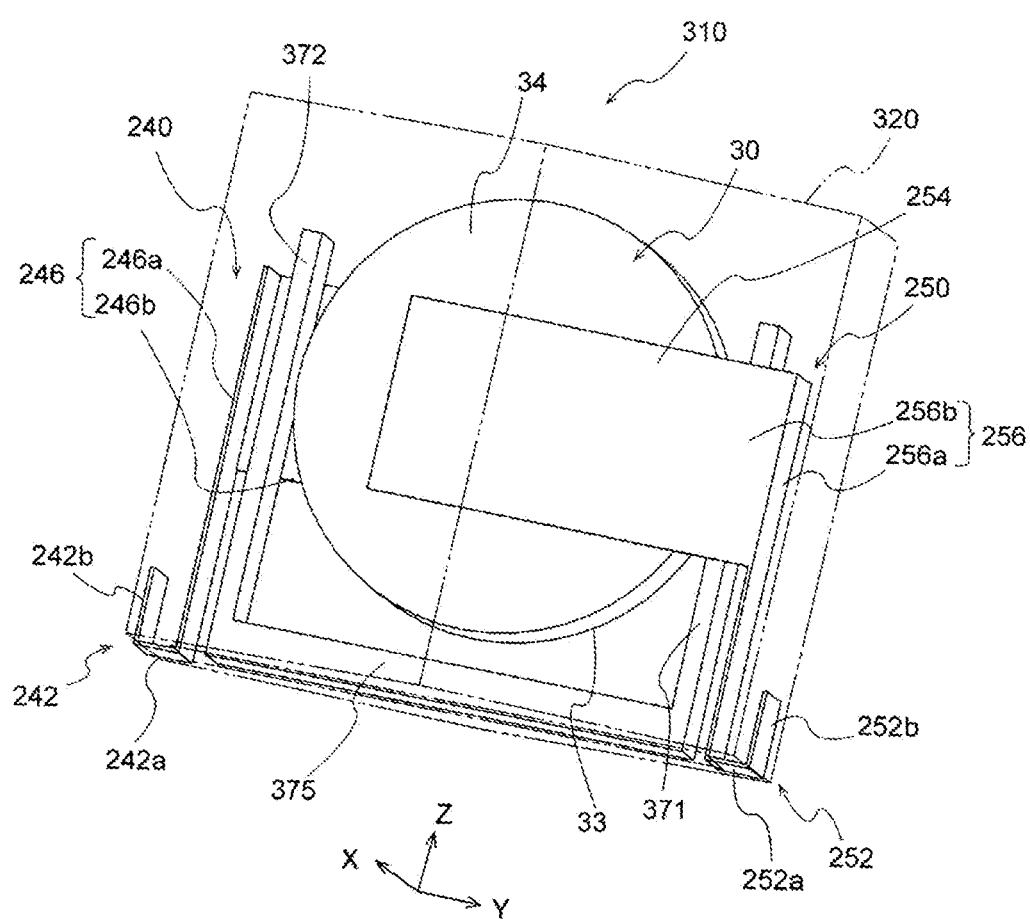
FIG. 12 is a partial perspective view showing the inside of a case included in the electronic component shown in FIG. 10.

As shown in FIG. 10 to FIG. 12, regarding the electronic component 310, the shapes of the accommodation part 321 and opening 321a of the case 320 and the shape of the insulation member 370 are different from those of the electronic component 210 shown in FIG. 7 to FIG. 9. However, the shape of the outer surface of the case 320, the shapes of the first metal terminal 240, second metal terminal 250, and ceramic element 30, and so on are the same as those of the electronic component 210 according to the second embodiment. The electronic component 310 is mainly explained on the parts which are different from the electronic component 210 according to the second embodiment, and the parts which are the same as the second embodiment are given the same reference numbers and the explanation will be omitted.

As shown in FIG. 10, the case 320 of the electronic component 310 has an outer shape of roughly a hexagonal prism shape as similar to the case 220 shown in FIG. 7. However, unlike the case 220, the accommodation part 321 formed to the case 320 is a rectangular shape, and the shape of the opening 321a of the accommodation part 321 is also a rectangular parallelepiped shape. The shape of the accommodation part 321 can be selected depending on the size of the ceramic element 30 being placed in the accommodation part 321.

As shown in FIG. 12 which shows the perspective view of the case 320, the entire ceramic element 30, the first and second metal terminal arm parts 246 and 256 of the first metal terminal 240 and second metal terminal 250, and the first and second electrode connecting parts 244 and 254 are accommodated in the accommodation part 321 of the case 320. Also, the first mounting part 242 of the first metal terminal 240 and the second mounting part 252 of the second metal terminal 250 are exposed out of the accommodation part 321 through the opening 321a. The mounting base parts 242a and 252a of the first mounting part 242 and second mounting part 252 are provided on an opening edge 322 formed around the opening 321a.

As shown in FIG. 7 and FIG. 9, in the electronic component 210 according to the second embodiment, the insulation member 270 was integrally formed to the case 220. However, as shown in FIG. 12, in the electronic component 310 according to the third embodiment, the insulation member 370 may be at least partially separate from the case 320 (in the example shown in FIG. 12, the insulation member 370 is entirely separate).

As shown in FIG. 11, the insulation member 370 has an outer shape which is roughly a U-like shape. The insulation member 370 has a first portion 371 and a second portion 372 which are extending parallel to each other, and a connecting portion 375 connecting the first portion 371 and the second portion 372. The connecting part 375 extends in a direction which is roughly perpendicular to the first portion 371 and the second portion 372, and the connecting part 375 is connected to an end of the first portion 371 and an end of the second portion 372.

As shown in FIG. 10 and FIG. 12, the insulation member 370 is arranged in the accommodation part 321 so that the tips of the first portion 371 and second portion 372 are directing towards the upper base side. For example, the insulation member 370 is inserted and installed to the accommodation part 321 from the opening 321a after the ceramic element 30 to which the first metal terminal 240 and the second metal terminal 250 are connected is arranged in the accommodation part 321.

As shown in FIG. 10 and FIG. 12, in the electronic component 310, the connecting part 375 which is a part of the insulation member 370 is arranged at the opening 321a. Since at least part of the insulation member 370 is arranged at the opening 321a, the ceramic element 30 at the inside of the accommodation part 321 can be protected, and also the leakage of the mold resin filling the accommodation part 321 can be prevented. Note that, the insulation member 370 is, for example, fixed to the case 320 using adhesives, the mold resin filling the accommodation part 321, and so on.

As shown in FIG. 12, the first portion 371 of the insulation member 370 is arranged between the first electrode 33 and the second terminal arm part 256 (particularly, the second portion 256a). The second portion 372 of the insulation member 370 is arranged between the second electrode 34 and the first terminal arm part 246 (particularly, the second portion 246a). As similar to the insulation member 270 of the electronic component 210, regarding the insulation member 370 of the electronic component 310, the insulation properties between the first terminal arm part 246 and the second electrode 34 and between the second terminal arm part 256 and the first electrode 33 can be enhanced.

Besides mentioned in above, parts of the electronic component 310 according to the third embodiment which are in common with the electronic component 210 according to the second embodiment exhibit the same effects as the electronic component 210.

Fourth Embodiment

Figure 13:
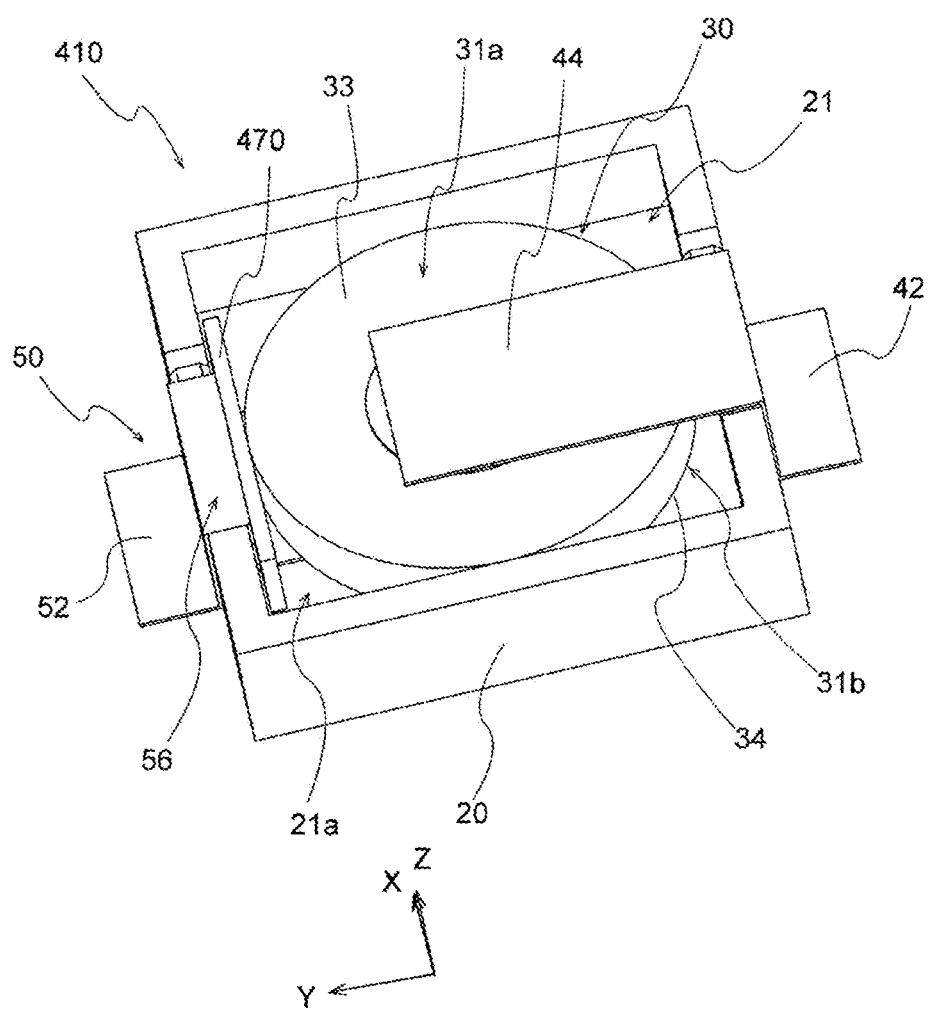
FIG. 13 is a schematic perspective diagram of an electronic component according to the fourth embodiment before a case cover is installed.
Figure 14:
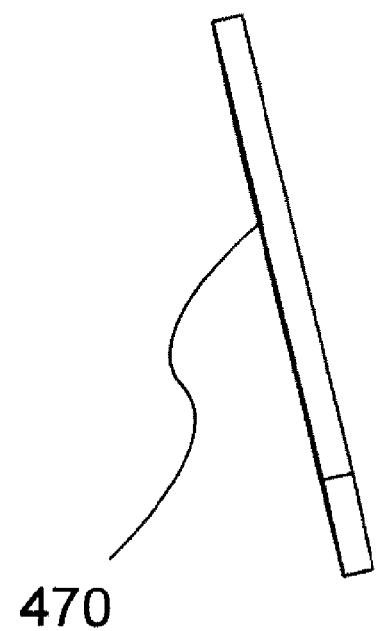
FIG. 14 is a schematic perspective diagram showing an insulation member included in the electronic component shown in FIG. 13.
Figure 14:
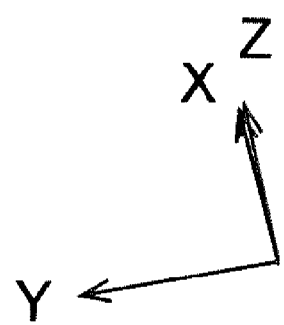

FIG. 13 is schematic perspective view of a fourth embodiment 410 according to the fourth embodiment before a case cover is installed. FIG. 14 is a perspective view of an insulation member 470 of the electronic component 410. The electronic component 410 is basically the same as the electronic component 10 according to the first embodiment except that the insulation member 470 is separate from the case cover 60 whereas the insulation member 70 of the electronic component 10 is integrally formed to the case cover 60 (see FIG. 3). The electronic component 410 will be mainly explained on the parts which are different from the electronic component 10, and the points which are the same as the electronic component 10 are given the same reference numbers and the explanation will be omitted.

As shown in FIG. 13 and FIG. 14, the insulation member 470 of the electronic component 410 is separate from the case cover and the case, and the insulation member 470 is arranged in the accommodation part 21 before the opening 21a of the case 20 is closed by the case cover. As shown in FIG. 13, the insulation member 470 is a rectangular plate shape, and as similar to the insulation member 70 shown in FIG. 5, the insulation member 470 is arranged between the first electrode 33 of the ceramic element 30 and the second arm part 56 of the second metal terminal 50 in the accommodation part. Note that, although it is not shown in FIG. 13, the case cover used for the electronic component 410 is basically the same as the case cover 60 shown in FIG. 3 except that the insulation member 470 of the electronic component 410 is not provided to the case cover lower face 63a.

As shown in FIG. 13 and FIG. 14, the electronic component 410 has the insulation member 470 which is separate from the case 20 and the case cover, thereby, for example, the insulation member 470 can also be used for other electronic components with different shapes. Furthermore, the parts of the electronic component 410 according to the fourth embodiment which are in common with the electronic component 10 according to the first embodiment exhibit the same effects as the electronic component 10.

Fifth Embodiment

Figure 15:
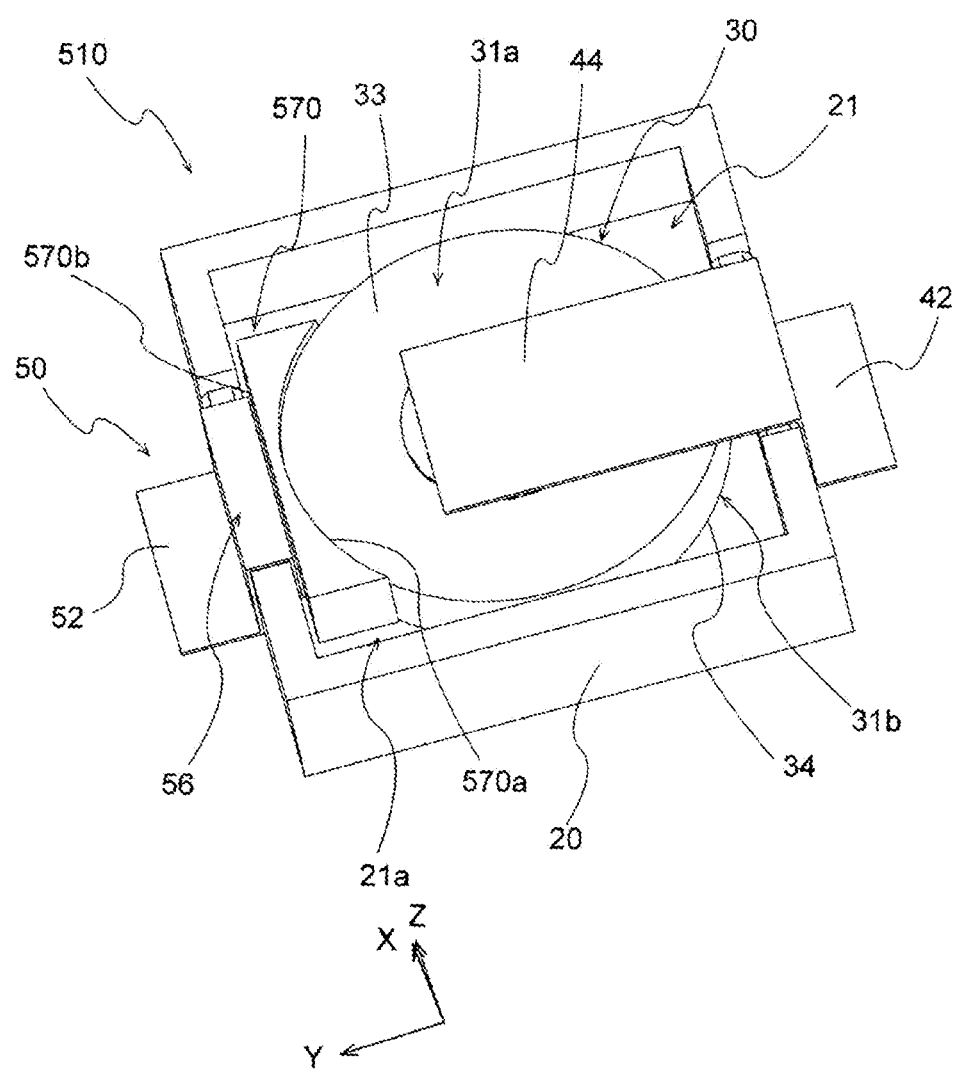
FIG. 15 is a schematic perspective diagram of an electronic component according to the fifth embodiment before a case cover is installed.
Figure 16:
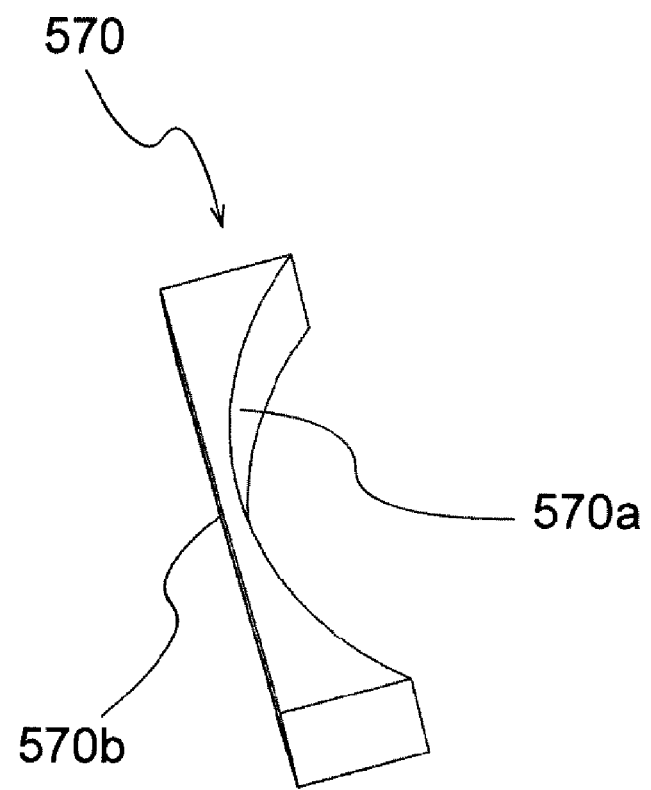
FIG. 16 is a schematic perspective diagram showing an insulation member included in the electronic component shown in FIG. 15.
Figure 16:
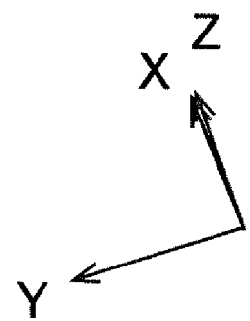

FIG. 15 is a schematic perspective view of an electronic component 510 according to the fifth embodiment before a case cover is installed. FIG. 16 is a perspective view of an insulation member 570 of the electronic component 510. The electronic component 510 is basically the same as the electronic component 410 according to the fourth embodiment except that the insulation member 570 has different shape. The electronic component 510 will be mainly explained on the parts which are different from the electronic component 410, and the parts which are the same as the electronic component 410 are given the same reference numbers and the explanation will be omitted.

As shown in FIG. 15 and FIG. 16, the insulation member 570 of the electronic component 510 is separate from the case and the case cover which is similar to the insulation member 470 of the electronic component 410. As shown in FIG. 16, the insulation member 570 has an arc-shaped portion 570a which follows the circumference of the ceramic element 30. Also, in the insulation member 570, the arc-shaped portion 570a is facing the surface of the ceramic element 30 and a straight-line portion 570b, which is facing the opposite direction of the arc-shaped portion 570a, is facing the rising part 56a of the second terminal arm part 56.

As similar to the insulation member 470 shown in FIG. 13, the insulation member 570 is arranged between first electrode 33 of the ceramic element 30 and the second terminal arm part 56 (particularly, the rising part 56a) of the second metal terminal 50 in the accommodation part 21. Since the insulation member 570 has the arc-shaped portion 570a and the straight-line portion 570b, this can prevent the position shifting while assembling, and the insulation member 570 can be accurately placed to the predetermined position in the accommodation part 21.

Furthermore, the parts of the electronic component 510 according to the fifth embodiment which are in common with the electronic component 410 according to the fourth embodiment exhibit the same effects as the electronic component 410.

Other Embodiments

Hereinabove, several embodiments were mentioned to described the electronic component according to the present disclosure, and many other embodiments and modification examples may be included within the scope of the disclosure. For example, the insulation member included in the electronic component may be separated into a plurality of independent members, and some of insulation members may be integrally formed to other members such as a case cover 60 and so on, and another insulation member may be separated from other members.

Also, the shapes of members included in the electronic component shown in the embodiments are merely examples, and these may be changed within the scope of the present technical idea. For example, in the above-mentioned embodiments, one ceramic element 30 was placed in the accommodation parts 21 and 221, however, the accommodation parts 21 and 221 may include a plurality of ceramic elements 30 and other metal terminals. Note that, the electronic components 10, 210, 310, 410, and 510 may or may not include the mold resin. Note that, when the electronic components 10, 210, 310, 410, and 510 include the mold resin, preferably the insulation members 70, 270, 370, 470 are provided separately from the mold resin, from the point of accurately arranging the insulation members 70, 270, 370, and 470.

Figure 17:
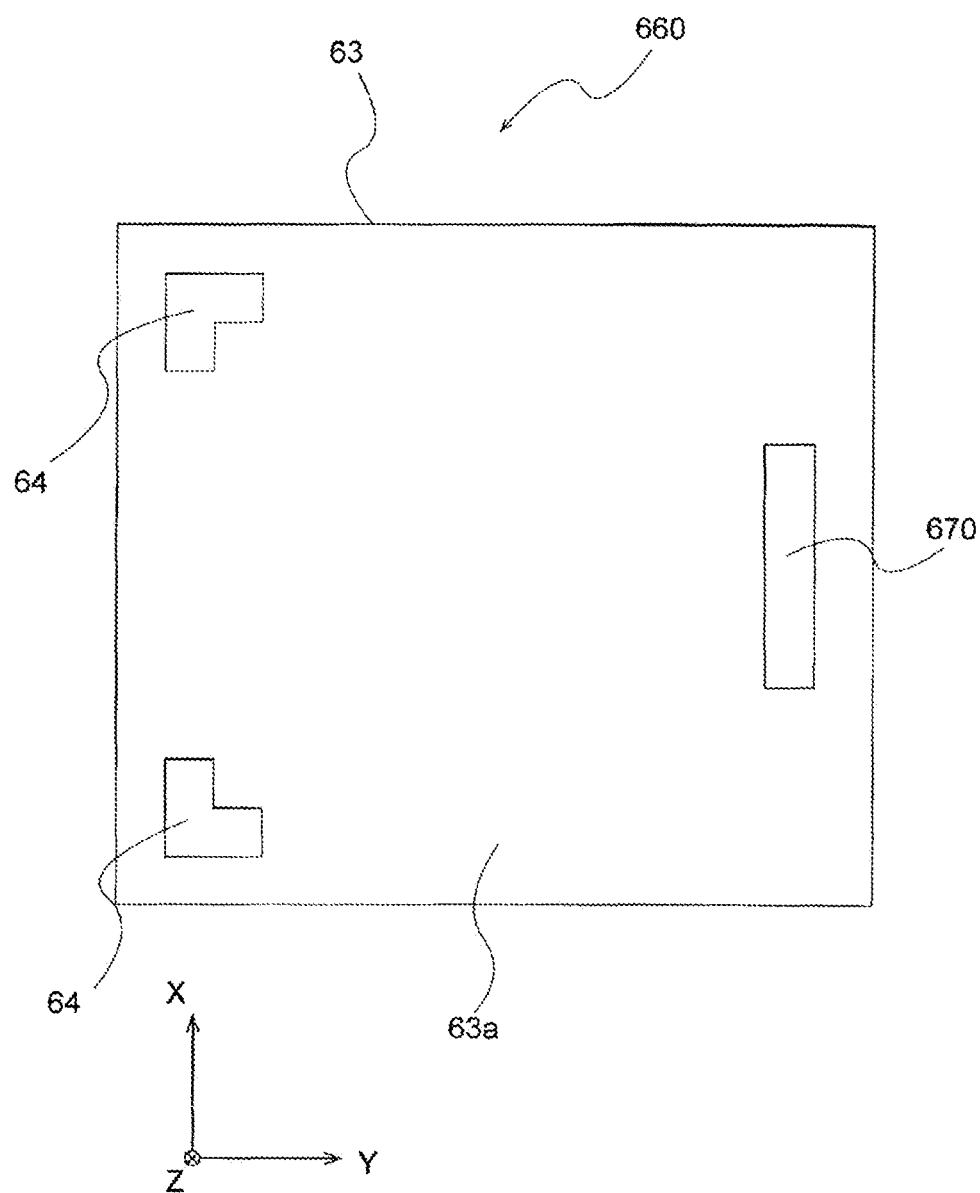
FIG. 17 is a planner diagram of a case cover and so on included in an electronic component according to a modification example viewing from diagonally below.

Also, for example, FIG. 17 shows an outer appearance of a case cover 660 and an insulation member 670 from below as a modification example which can be used in place of the case cover 60 and the insulation member 70 of the electronic component 10 according to the first embodiment shown in FIG. 3.

As shown in FIG. 17, the insulation member 670 is provided to the case cover lower face 63a of the case cover 660, as similar to the case cover 60 shown in FIG. 3. The insulation member 670 shown in FIG. 17 has a shorter length in X-axis direction compared to the insulation member 70 shown in FIG. 3. Note that, as similar to the insulation member 70 shown in FIG. 3, the insulation member 670 is also arranged between the first electrode 33 of the ceramic element 30 and the second terminal part 56 of the second metal terminal 50, and enhances the insulation property of the electronic component.

NUMERICAL REFERENCES 10, 210, 310, 410, 510 . . . Electronic component
20, 220, 320 . . . Case
21, 221, 321 . . . Accommodation part
21a, 221a, 321a . . . Opening
21b . . . Corner part
21c . . . Bottom face
221b . . . First inner surface
221c . . . Second inner surface
22 . . . Case lower face
222, 322 . . . Opening edge
223 . . . Upper base
27 . . . First space
28 . . . Second space
30 . . . Ceramic element
31a . . . First main face
31aa . . . Extending face
33 . . . First electrode
31b . . . Second main face
34 . . . Second electrode
35 . . . Dielectric part
40, 240 . . . First metal terminal
42, 242 . . . First mounting part
242a . . . First mounting base part
242b . . . First folded part
44, 244 . . . First electrode connecting part
46, 246 . . . First terminal arm part
246a . . . Second portion
246b . . . First portion
50, 250 . . . Second metal terminal
52 . . . Second mounting part
252a . . . Second mounting base part
252b . . . Second folded part
54, 254 . . . Second electrode connecting part
56, 256 . . . Second terminal arm part
56a . . . Rising part
256a . . . Second portion
56b, 256b . . . First portion
56c . . . Third portion
60, 660 . . . Case cover
63 . . . Case cover main part
63a . . . Case cover lower face
64 . . . Projection
70, 270, 370, 470, 570, 670 . . . Insulation member
570a . . . Arc-shaped portion
570b . . . Straight-line portion
271, 371 . . . First portion
272, 372 . . . Second portion
375 . . . Connecting part
VL . . . Virtual line

What is claimed is:

1. An electronic component comprising:
a case including an accommodation part having an opening;
a ceramic element arranged in the accommodation part and having a first main face and a second main face facing each other, a first electrode formed to the first main face, and a second electrode formed to the second main face;
a first metal terminal including a first electrode connecting part connecting to the first electrode, a first mounting part exposed out of the accommodation part through the opening, and a first terminal arm part connecting the first electrode connecting part and the first mounting part;
a second metal terminal including a second electrode connecting part connecting to the second electrode, a second mounting part exposed out of the accommodation part through the opening, and a second terminal arm part connecting the second electrode connecting part and the second mounting part;
an insulation member arranged between the first electrode and the second terminal arm part in the accommodation part; and
a case cover at least partially covering the opening, wherein
at least part of the insulation member connects to the case cover,
the case cover includes a plurality of projections corresponding to corner parts of the opening, and
the plurality of projections and the insulation member are inserted into the accommodation part.

2. The electronic component according to claim 1, wherein the insulation member intersects a virtual line which connects the first electrode and the second terminal arm part in a minimum distance along an extending face of the first main face.

3. The electronic component according to claim 1, wherein the first main face is facing to a side of the opening and the second main face is facing to an opposite side of the opening.

4. The electronic component according to claim 3, wherein the second electrode connecting part faces a bottom face of the accommodation part, and the second terminal arm part comprises a rising part which rises from the bottom face and extends towards the opening.

5. The electronic component according to claim 1 comprising a mold resin arranged in the accommodation part.

6. An electronic component comprising:
a case including an accommodation part having an opening;
a ceramic element arranged in the accommodation part and having a first main face and a second main face facing each other, a first electrode formed to the first main face, and a second electrode formed to the second main face;
a first metal terminal including a first electrode connecting part connecting to the first electrode, a first mounting part exposed out of the accommodation part through the opening, and a first terminal arm part connecting the first electrode connecting part and the first mounting part;
a second metal terminal including a second electrode connecting part connecting to the second electrode, a second mounting part exposed out of the accommodation part through the opening, and a second terminal arm part connecting the second electrode connecting part and the second mounting part; and
an insulation member arranged between the first electrode and the second terminal arm part in the accommodation part, wherein
wherein the first main face and the second main face are facing along a direction roughly perpendicular to the opening.

7. The electronic component according to claim 6, wherein the insulation member comprises a first portion arranged between the first electrode and the second terminal arm part in the accommodation part, and a second portion arranged between the second electrode and the first terminal arm part in the accommodation part.

8. The electronic component according to claim 7, wherein at least part of the insulation member connects to the case.

9. The electronic component according to claim 6, wherein the insulation member intersects a virtual line which connects the first electrode and the second terminal arm part in a minimum distance along an extending face of the first main face.

10. The electronic component according to claim 6, further comprising a mold resin arranged in the accommodation part.

11. An electronic component comprising:
a case including an accommodation part having an opening;
a ceramic element arranged in the accommodation part and having a first main face and a second main face facing each other, a first electrode formed to the first main face, and a second electrode formed to the second main face;
a first metal terminal including a first electrode connecting part connecting to the first electrode, a first mounting part exposed out of the accommodation part through the opening, and a first terminal arm part connecting the first electrode connecting part and the first mounting part;
a second metal terminal including a second electrode connecting part connecting to the second electrode, a second mounting part exposed out of the accommodation part through the opening, and a second terminal arm part connecting the second electrode connecting part and the second mounting part; and
an insulation member arranged between the first electrode and the second terminal arm part in the accommodation part,
wherein the insulation member is at least partially separate from the case.

12. The electronic component according to claim 11, wherein at least part of the insulation member is arranged to the opening.

* * * * *